United States Patent
Beckmann et al.

(10) Patent No.: US 11,623,407 B2
(45) Date of Patent: Apr. 11, 2023

(54) ENCODING VOLUMETRIC DATA TO SUPPORT TRUSTED TRANSACTION DELIVERY

(71) Applicant: General Electric Company, Schenectady, NY (US)

(72) Inventors: Benjamin Edward Beckmann, Niskayuna, NY (US); Peter Koudal, Niskayuna, NY (US); John Madelone, South Glens Falls, NY (US); John William Carbone, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/364,012

(22) Filed: Jun. 30, 2021

(65) Prior Publication Data

US 2021/0323236 A1 Oct. 21, 2021

Related U.S. Application Data

(63) Continuation of application No. 16/641,155, filed as application No. PCT/US2017/049682 on Aug. 31, 2017, now Pat. No. 11,077,617.

(51) Int. Cl.
*B29C 64/386* (2017.01)
*B33Y 50/00* (2015.01)
(Continued)

(52) U.S. Cl.
CPC ............ *B29C 64/386* (2017.08); *B29C 64/00* (2017.08); *B29C 64/245* (2017.08); *B33Y 50/00* (2014.12); *B33Y 70/00* (2014.12)

(58) Field of Classification Search
CPC ..... B29C 64/00; B29C 64/245; B29C 64/386; B33Y 50/00; B33Y 70/00
See application file for complete search history.

(56) References Cited

U.S. PATENT DOCUMENTS

| | | |
|---|---|---|
| 5,710,638 A | 1/1998 | Yamamoto et al. |
| 6,658,314 B1 | 12/2003 | Gothait |

(Continued)

FOREIGN PATENT DOCUMENTS

| | | |
|---|---|---|
| JP | 2007528240 A | 10/2007 |
| JP | 2012101444 A | 5/2015 |

(Continued)

OTHER PUBLICATIONS

Cubichain Stores Data of 3D Printed Aircraft Parts in Blockchain; 5 pages; printed from the Internet on Aug. 8, 2022; published on Dec. 7, 2016; by Joseph Young.*

(Continued)

*Primary Examiner* — Ronald D Hartman, Jr.
(74) *Attorney, Agent, or Firm* — Fletcher Yoder, PC

(57) ABSTRACT

According to some embodiments, a computer processor may receive an item definition file containing a volumetric description of the three-dimensional item and create a compressed item definition file including a compressed volumetric description of the three-dimensional item. For example, the item definition file may include a plurality of item slices, from a bottom item slice to a top item slice, each item slice describing a two-dimensional portion of the three-dimensional item. For at least some of the item slices, the computer processor may encode data in the item definition file describing a particular item slice in terms of differences between that particular item slice and another item slice (e.g., a neighboring item slice directly below that particular item slice or an anchor item slice below that particular item slice).

20 Claims, 23 Drawing Sheets

(51) Int. Cl.
  *B29C 64/245* (2017.01)
  *B33Y 70/00* (2020.01)
  *B29C 64/00* (2017.01)

(56) References Cited

U.S. PATENT DOCUMENTS

| | | | |
|---|---|---|---|
| 6,730,252 | B1 | 5/2004 | Tech et al. |
| 7,428,334 | B2 | 9/2008 | Schoisswohl et al. |
| 8,315,315 | B2 | 11/2012 | Amonou et al. |
| 8,477,153 | B2 | 7/2013 | Lin et al. |
| 8,660,353 | B2 | 2/2014 | Storti et al. |
| 8,666,142 | B2 | 3/2014 | Shkolnik et al. |
| 8,874,248 | B2 | 10/2014 | Young et al. |
| 9,424,503 | B2 | 8/2016 | Kieser |
| 9,994,339 | B2 * | 6/2018 | Colson ............... B65D 65/38 |
| 10,063,529 | B2 | 8/2018 | Milazzo et al. |
| 2003/0002665 | A1 | 1/2003 | Sako et al. |
| 2015/0066178 | A1 * | 3/2015 | Stava ............... B29C 64/40 700/98 |
| 2015/0134955 | A1 | 5/2015 | Lacaze et al. |
| 2015/0248504 | A1 | 9/2015 | Glunz et al. |
| 2016/0134955 | A1 | 5/2016 | Li et al. |
| 2016/0164884 | A1 | 6/2016 | Sriram et al. |
| 2016/0332383 | A1 | 11/2016 | Sanchez et al. |
| 2016/0346840 | A1 | 12/2016 | Clark et al. |
| 2016/0370791 | A1 | 12/2016 | Revanur et al. |
| 2017/0279783 | A1 * | 9/2017 | Milazzo ............... B33Y 50/00 |
| 2018/0012311 | A1 * | 1/2018 | Small ............... B33Y 50/02 |
| 2018/0096175 | A1 * | 4/2018 | Schmeling ............ G06F 1/3206 |
| 2018/0136633 | A1 * | 5/2018 | Small ............... G05B 19/4099 |
| 2018/0173203 | A1 * | 6/2018 | Freer ............... B29C 64/393 |
| 2018/0253080 | A1 | 9/2018 | Meess et al. |
| 2019/0095418 | A1 | 3/2019 | Gonzalez et al. |
| 2019/0147174 | A1 * | 5/2019 | Narasimhan ....... G06Q 10/0833 726/29 |

FOREIGN PATENT DOCUMENTS

| | | |
|---|---|---|
| JP | 2017094586 A | 6/2017 |
| WO | 2016171719 A1 | 10/2016 |
| WO | WO-2019045737 A1 * 3/2019 ........... B29C 64/386 |

OTHER PUBLICATIONS

JP Application No. 2020-511468; 1st JP Office Action dated Sep. 16, 2021; pp. 1-5.

Shu, Chang, et al.: "Model-based scanning path generation for inspection", Second International Conference on 3-D Digital Imaging and Modeling (Cat. No. PR00062), pp. 118-124, 1999, Ottawa.

Pandey, Pulak Mohan, et al.: "Slicing procedures in layered manufacturing: a review", Rapid Prototyping Journal, vol. 9, Issue: 5, pp. 274-288, 2003.

Youtube video entitled: "Reduce .STL and .OBJ File Size Using Blender", posted by Pinshape; at web address: https://www.youtube.com/watch?v=IcTDBJt9MfE: taken from the internet on Dec. 3, 2020; published on the internet on Nov. 10, 2014.

Abeyratne, Saveen A., et al.; "Blockchain Ready Manufacturing Supply Chain Using Distributed Ledger", International Journal of Research in Engineering and Technology, vol. 5, No. 9, Sep. 25, 2016, pp. 1-11.

International Search Report/Written Opinion; PCT/US17/49682, dated Nov. 16, 2017; 10 pages.

Showdown!! 3D Model Compression at Scale: Draco vs. Open3DGC; by Ian Kerr; 3 pages; printed from the internet Dec. 3, 2020; published 2017.

How to Reduce the File Size of .STL and .OBJ 3D Models: by Fabian; 2 pages: printed from the internet on Dec. 3, 2020; published 2017.

EP Application No. 17923384.6; EP Search Report dated Mar. 15, 2021; pp. 1-8.

* cited by examiner

ENCODING VOLUMETRIC DATA TO SUPPORT TRUSTED TRANSACTION DELIVERY

CROSS-REFERENCE TO RELATED APPLICATIONS

This is a continuation application of U.S. patent application Ser. No. 16/641,155, entitled "ENCODING VOLUMETRIC DATA TO SUPPORT TRUSTED TRANSACTION DELIVERY," filed Feb. 21, 2020, which claims priority from and the benefit of PCT Application No. PCT/US2017/049682, entitled "ENCODING VOLUMETRIC DATA TO SUPPORT TRUSTED TRANSACTION DELIVERY," filed Aug. 31, 2017, each of which is hereby incorporated by reference in its entirety for all purposes.

BACKGROUND

Some embodiments disclosed herein relate to industrial assets and, more particularly, to a system to facilitate creation of a three-dimensional item by an additive manufacturing process which may be enhanced by a blockchain enabled intellectual property exchange ecosystem.

A customer might want to obtain a three-dimensional item, such as a nozzle for a jet engine, a replacement part for a wind turbine, etc. In some cases, the customer might have the part created by arranging to have an item definition file transmitted to an additive manufacturing platform. Typically, the item definition file contains a volumetric description of the three-dimensional item that is used by an additive manufacturing printer to produce the item. Note, however, that such item definition files can be relatively large in size (especially when high-resolution definitions are utilized) and can be difficult to transmit over a communication network and/or to process by a computer system. Moreover, transmitting this type of information can make it difficult to protect any intellectual property that may protect the item (e.g., because the entire file might be copied and used to create an identical item). It would therefore be desirable to provide systems and methods to efficiently and accurately process item definition files.

SUMMARY

According to some embodiments, a computer processor may receive an item definition file containing a volumetric description of the three-dimensional item and create a compressed item definition file including a compressed volumetric description of the three-dimensional item. For example, the item definition file may include a plurality of item slices, from a bottom item slice to a top item slice, each item slice describing a two-dimensional portion of the three-dimensional item. For at least some of the item slices, the computer processor may encode data in the item definition file describing a particular item slice in terms of differences between that particular item slice and another item slice (e.g., a neighboring item slice directly below that particular item slice or an anchor item slice below that particular item slice).

According to other embodiments, a computer processor may receive a compressed item definition file containing a compressed volumetric description of the three-dimensional item. The computer processor may then create an item definition file including a non-compressed volumetric description of the three-dimensional item and output the item definition file for use by an additive manufacturing process printer.

Some embodiments comprise: means for receiving an item definition file containing a volumetric description of the three-dimensional item, wherein the item definition file includes a plurality of item slices, from a bottom item slice to a top item slice, each item slice describing a two-dimensional portion of the three-dimensional item; means for (for at least some of the item slices) encoding data in the item definition file describing a particular item slice in terms of differences between that particular item slice and another item slice to create a compressed item definition file including a compressed volumetric description of the three-dimensional item; and means for transmitting the compressed item definition file to an additive manufacturing printer associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

Technical effects of some embodiments of the invention are improved and computerized ways to efficiently and accurately process item definition files. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
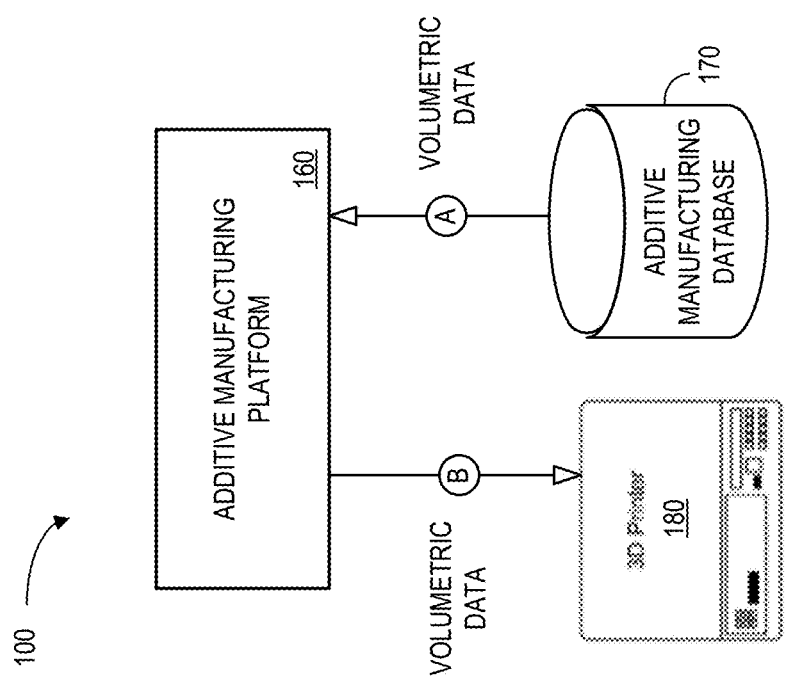
FIG. 1 is a high-level block diagram of an additive manufacturing system.

A customer might have a three-dimensional item created by an additive manufacturing platform (e.g., including a platform owned by the customer and/or a third-party platform). For example, FIG. 1 is a high-level block diagram of an additive manufacturing system 100 including an additive manufacturing platform 160 and an additive manufacturing database 170 storing an item definition file containing a volumetric description of the three-dimensional item. The additive manufacturing platform 160 may retrieve the file from the database 170 at (A) and transmit the file, including the volumetric data, to a three-dimensional printer 180 at (B). The printer 180 can then create the item in accordance with the volumetric data.

Figure 2:
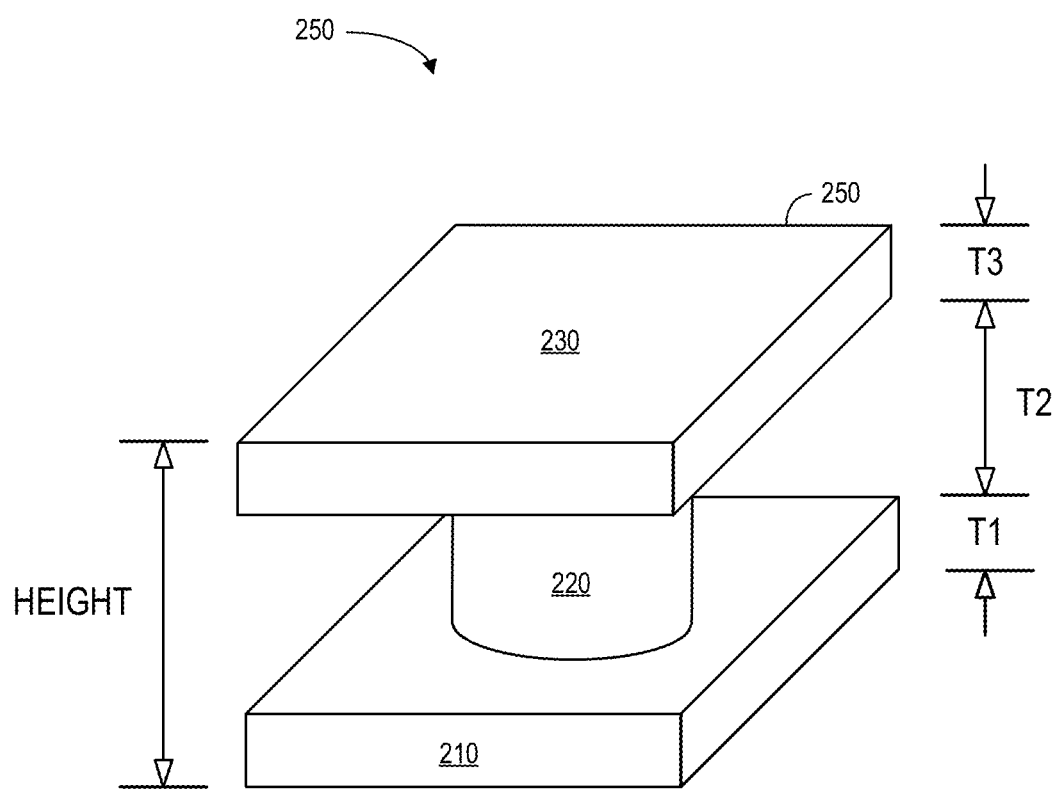
FIG. 2 is an example of a three-dimensional item that might be created by an additive manufacturing system.

Consider, for example, a three-dimensional item 250, such as the one illustrated in FIG. 2, that might be created by an additive manufacturing system. The item 250 includes a bottom portion 210, a center portion 220, and a top portion 230. The bottom and top portions 210, 230 are solid three-dimensional rectangular prisms (or cuboids) while the center portion 220 is a solid tube or cylinder. For the purpose of illustration only, overall height of the item is 32 millimeters ("mm") with the bottom and top portions 210, 230 being 7 mm high and the center portion 220 is 18 mm high. The cross-section of the bottom and top portions 210, 230 are 8 mm×8 mm squares while the cross-section of the center portion 220 is a circle having a radius of approximately 4 mm.

Figure 3:
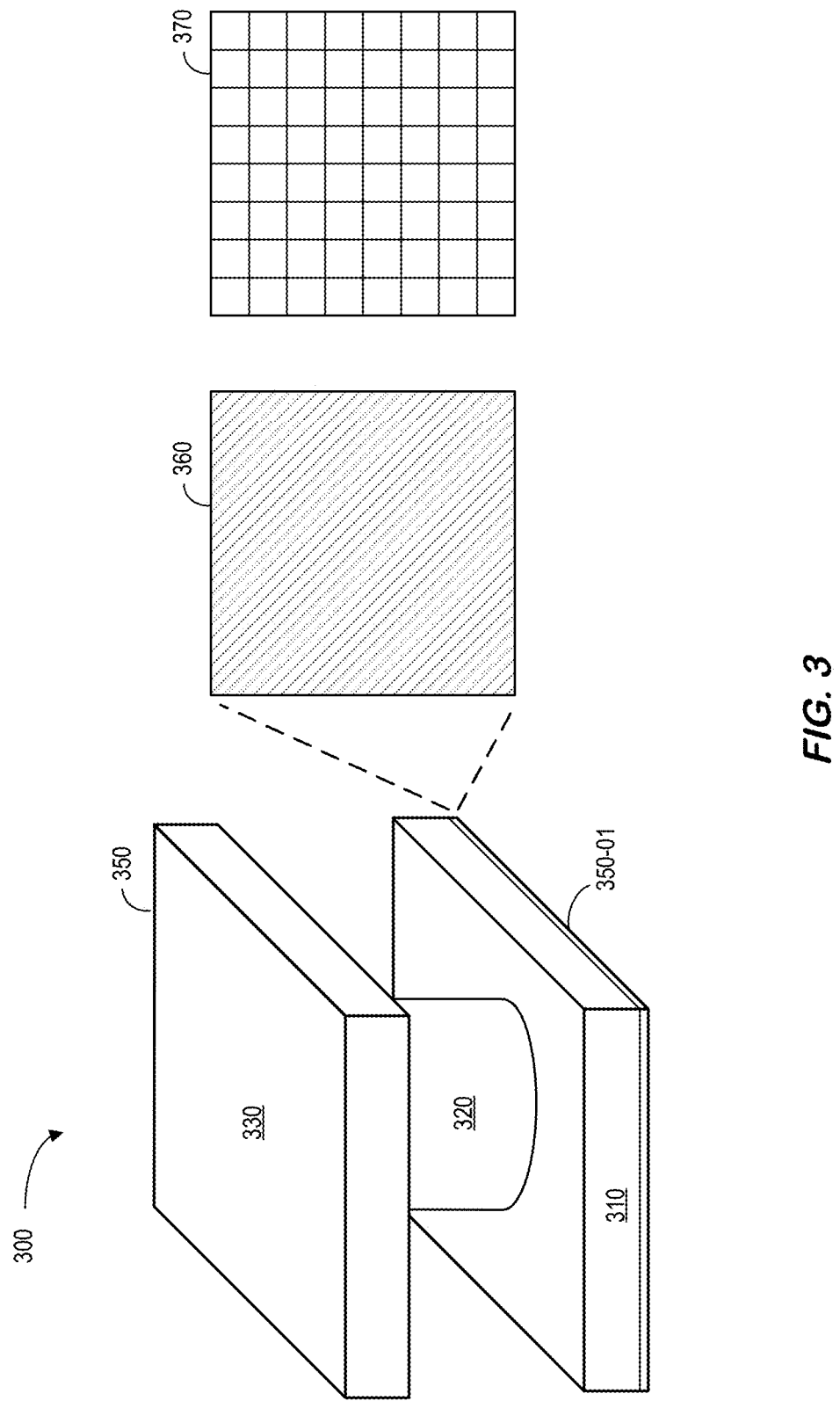
FIG. 3 illustrates a first item slice of a three-dimensional item.
Figure 4:
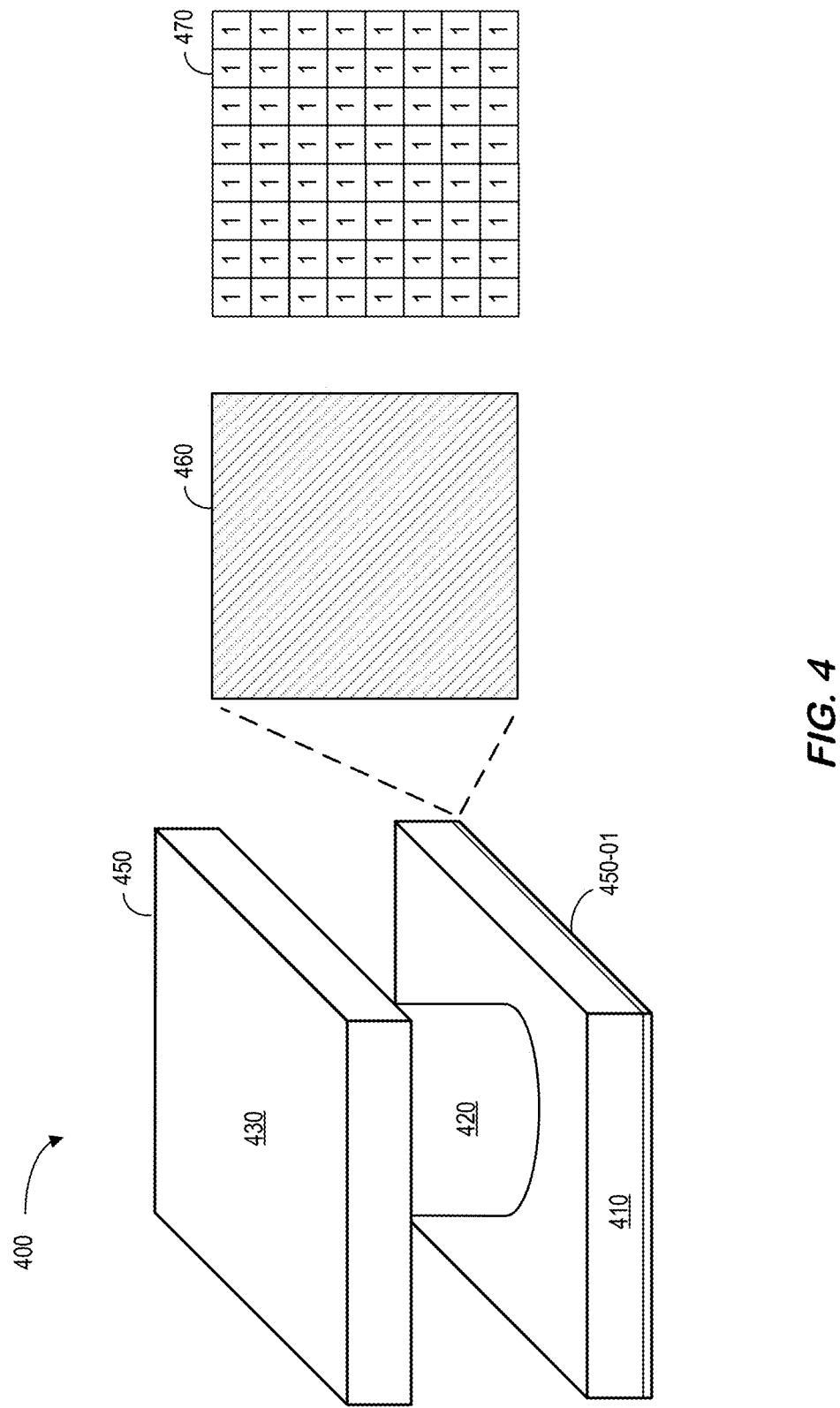
FIG. 4 illustrates one technique to encode a volumetric description of a first item slice of a three-dimensional item.

Typically, an item definition file, such as a Computer Aided Design ("CAD") file, will contain a volumetric description of the three-dimensional item 250 that can be used by an additive manufacturing printer to produce the item. These files usually represent a series of "item slices" associated with the three-dimensional item 250. For the purpose of this example, a volumetric representation having a 1 mm×1 mm×mm resolution will be used. Note, however, that actual three-dimensional printers (and associated item definition files) can have much more detailed resolutions. FIG. 3 illustrates a first item slice 350-01 of a three-dimensional item 350 having a bottom portion 310, a center portion 320, and a top portion 330. As illustrated in FIG. 3, a cross-sectional view 360 of the first item slice 350-01 can be divided into an 8×8 matrix 370 (with each cell in the matrix representing a 1 mm×1 mm×1 mm volume). FIG. 4 illustrates an item 450 with three portions 410, 420, 430. As before, a cross-sectional view 460 of the first item slice 450-01 can be represented by an 8×8 matrix of binary values 470 (with a "0" indicating a 1 mm×1 mm×1 mm empty volume and "1" indicating a 1 mm×1 mm×1 mm solid volume and "1"). Thus, 64 bits of data are used to volumetrically represent the first item slice 450-01.

Figure 5:
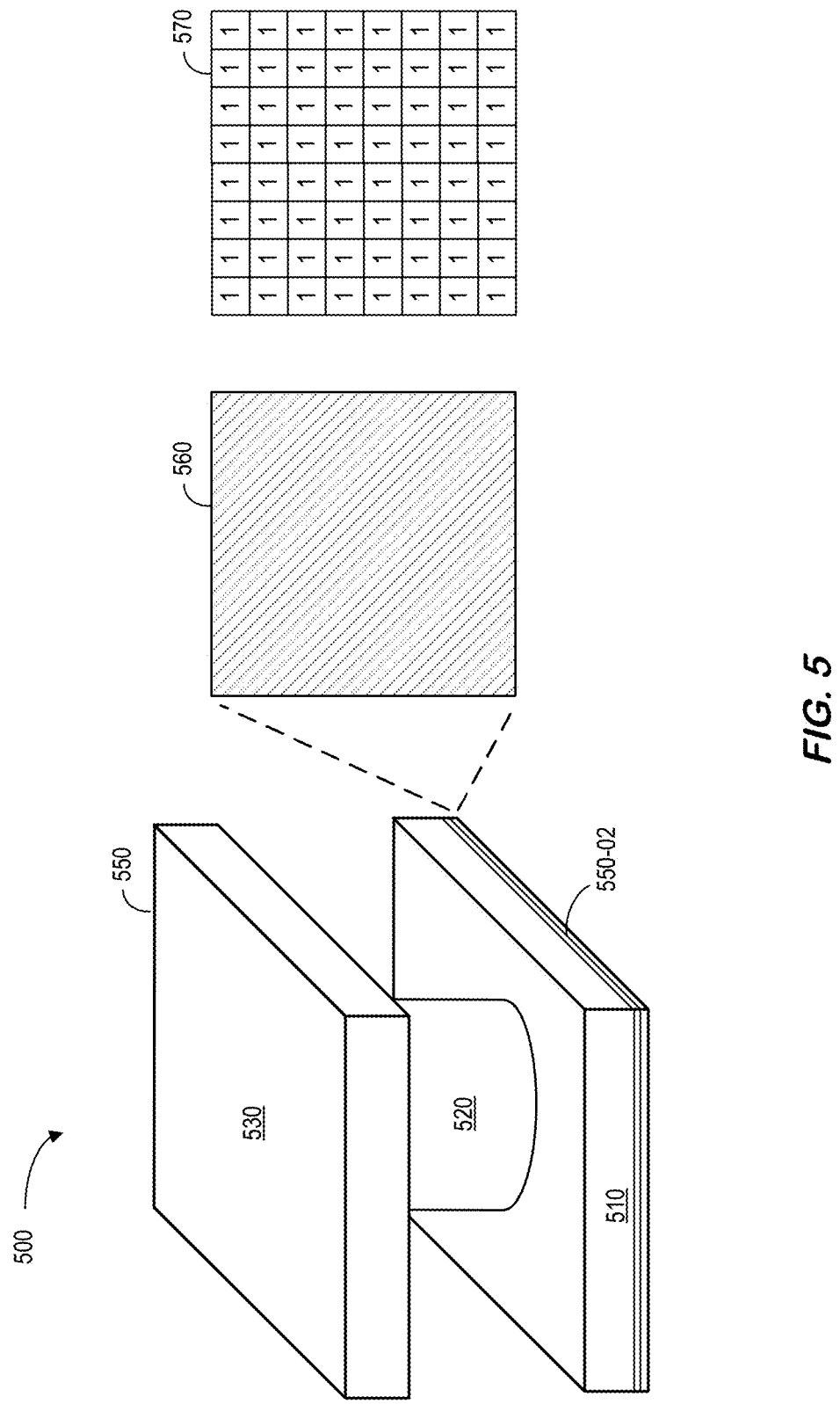
FIG. 5 illustrates one technique to encode a volumetric description of a second item slice of a three-dimensional item.

FIG. 5 illustrates a second item slice 550-02 of a three-dimensional item 550 having three portions 510, 520, 530. As illustrated in FIG. 5, a cross-sectional view 560 of the second item slice 550-02 can be represented by an 8×8 matrix of binary values 570 (with a "0" indicating a 1 mm×1 mm×1 mm empty volume and "1" indicating a 1 mm×1 mm×1 mm solid volume and "1"). Thus, 64 bits of data are again used to volumetrically represent the second item slice 550-02.

Figure 6:
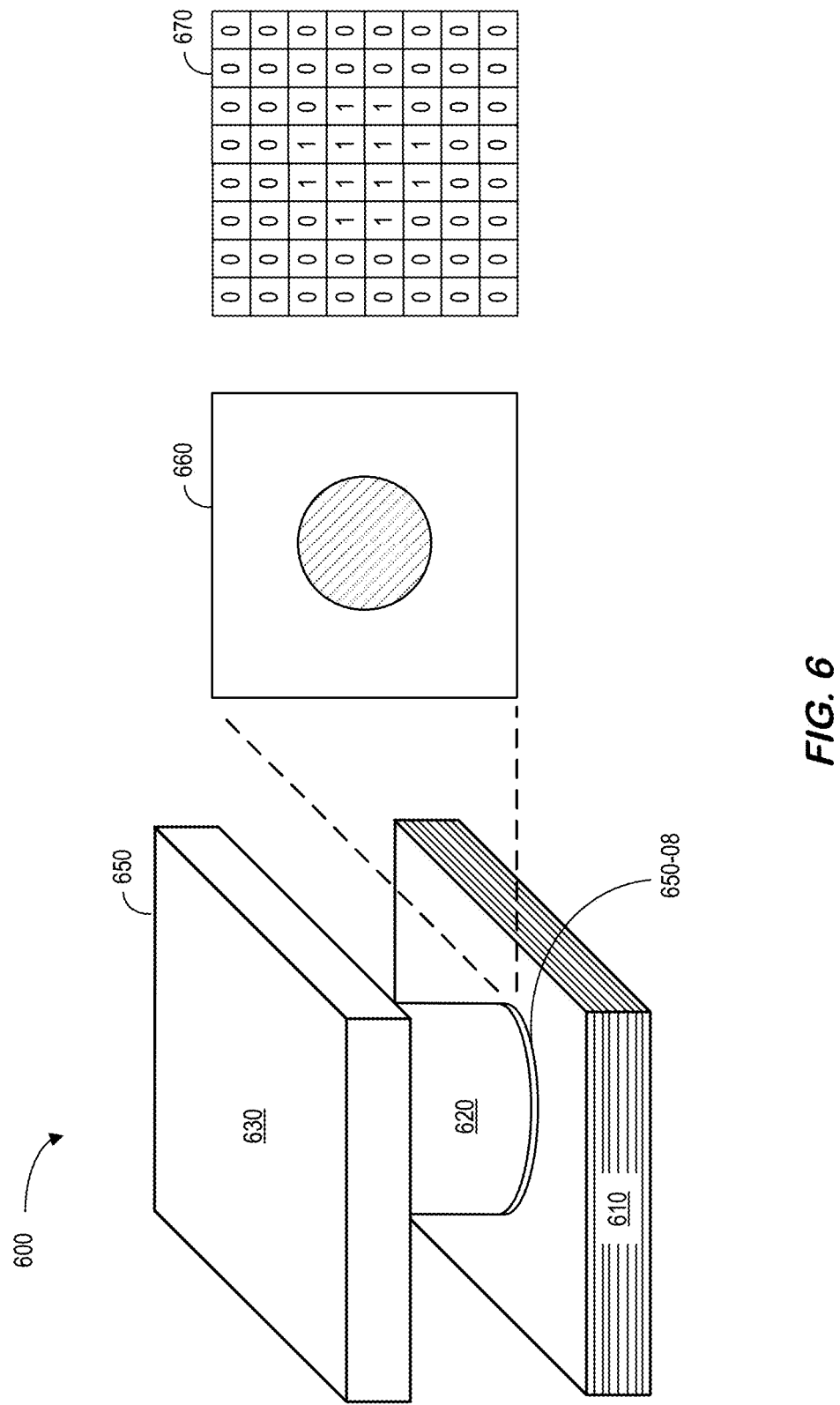
FIG. 6 illustrates one technique to encode a volumetric description of another item slice of a three-dimensional item.

Since the first item slice 450-01 and the second item slice 550-02 both come from the same portion 410, 510 of the item 425, 525 (and therefore have identical cross-sections 460, 560) they share identical digital representations 470, 570. FIG. 6 illustrates another item slice 650-08 of a three-dimensional item 650 (having three portions 610, 620, 630) taken from the bottom of the center portion 620. As illustrated in FIG. 6, a cross-sectional view 660 of the item slice 650-08 is now a circle having a radius of approximately 4 mm. Moreover, this circular cross-section 660 can again be represented by an 8×8 matrix of binary values 670. Thus, 64 bits of data are again used to volumetrically represent the item slice 650-08. This can be repeated for all 32 slices of the item 650, the overall number of bits to describe the item will be 32 slices multiplied by 64 bits-per-slice for a total of 2048 bits. Note, however, actual item definition files might be associated with larger items and/or high resolutions and therefore can be substantially large making it difficult to transmit them over a communication network and/or to process them by a computer system. Likewise, the storage of the files and/or the memory needed to process the files can be impractical. Moreover, transmitting this type of information can make it difficult to protect any intellectual property that may protect the item (e.g., because the entire file might be copied and used to create an identical item).

Figure 7:
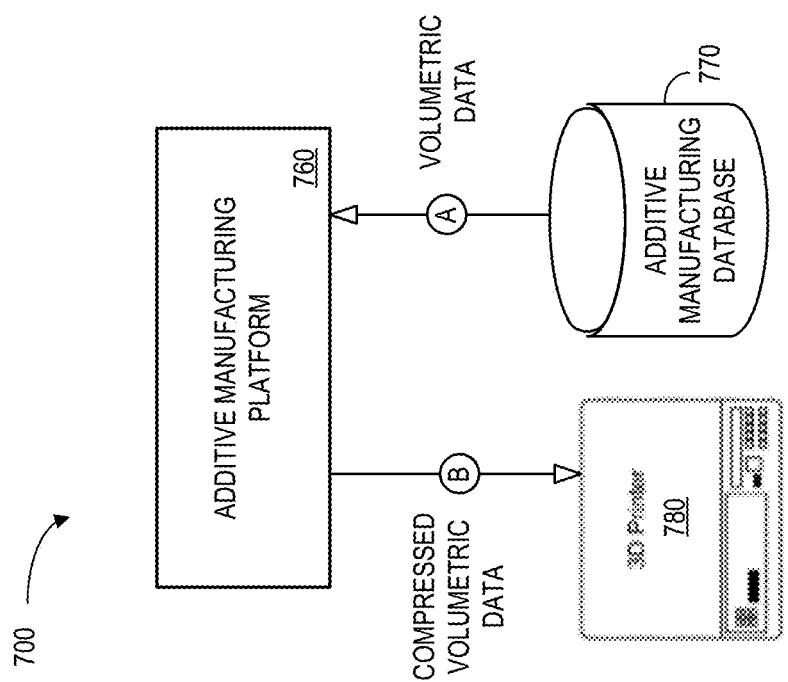
FIG. 7 is a high-level block diagram of an additive manufacturing system according to some embodiments.

It would therefore be desirable to provide systems and methods to efficiently and accurately process item definition files. FIG. 7 is a high-level block diagram of a system 700 according to some embodiments. In particular, the system 700 includes an additive manufacturing platform 760 and an additive manufacturing database 770 storing an item definition file containing a volumetric description of a three-dimensional item. The additive manufacturing platform 760 may retrieve the file from the database 770 at (A). According to some embodiments, the additive manufacturing platform 760 may then create a compressed item definition file including a compressed volumetric description of the item. The file, including the volumetric data, may then be transmitted to a three-dimensional printer 780 at (B). The printer 780 can then create the item in accordance with the volumetric data.

The additive manufacturing platform 760 might be, for example, associated with a Personal Computer ("PC"), laptop computer, a tablet computer, a smartphone, an enterprise server, a server farm, and/or a database or similar storage devices. According to some embodiments, an "automated" additive manufacturing platform 760 may automatically compress the item definition file. As used herein, the term "automated" may refer to, for example, actions that can be performed with little (or no) intervention by a human.

As used herein, devices, including those associated with the additive manufacturing platform 760 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The additive manufacturing platform 760 may store information into and/or retrieve information from data stores. The data stores might, for example, store electronic records representing prior printing operations, printing operations currently in process, etc. The data stores may be locally stored or reside remote from the additive manufacturing platform 760. Although a single additive manufacturing platform 760 is shown in FIG. 7, any number of such devices may be included. Moreover, various devices described herein might be combined according to embodiments of the present invention. For example, in some embodiments, the additive manufacturing platform 760, data stores, and/or other devices might be co-located and/or may comprise a single apparatus. According to some embodiments, the information in the additive manufacturing database 770 might already be represented in a compressed form and/or a compressed version may be received by the additive manufacturing platform 760 from a remote device (e.g., a remote digital transaction engine), in which case the additive manufacturing platform 760 might decode the information before sending it to the three-dimensional printer 708. That is, any of the devices described herein—or other devices—might perform the encoding (or decoding) processes according to any of the embodiments.

Figure 8A:
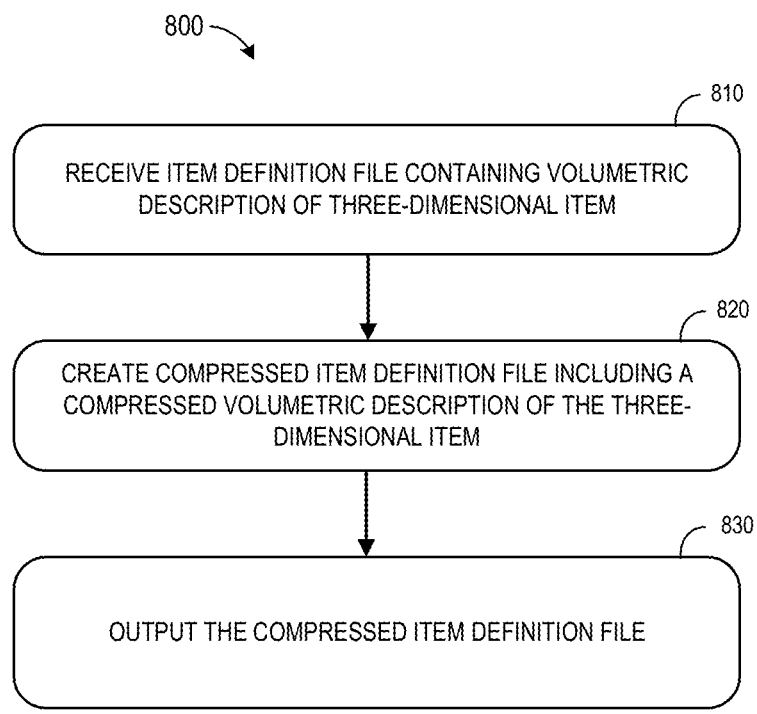
FIGS. 8A and 8B illustrate methods of creating compressed volumetric data in accordance with some embodiments.

In this way, the system 700 may efficiently and accurately facilitate creation of an industrial asset item. Note that the system 700 of FIG. 7 is provided only as an example, and embodiments may be associated with additional elements or components. According to some embodiments, the elements of the system 700 provide blockchain enabled collaborative transaction information processing. For example, FIG. 8A illustrates a method 800 that might be performed by the system 700 described with respect to FIG. 7, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 810, a system may receive an item definition file containing a volumetric description of a three-dimensional item. By ways of examples only, the three-dimensional item might be associated with an industrial asset, an engine, an aircraft, a locomotive, power generation, a dam, a wind turbine, or any other objected created on a layer-by-layer basis.

At 820, the system may create a compressed item definition file including a compressed volumetric description of the three-dimensional item. The compressed version of the file may then be output at 830. For example, the file might be output to an additive manufacturing printer. As used herein, the phrase "additive manufacturing" may refer to various types of three-dimensional printing, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"), powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED").

Figure 8B:
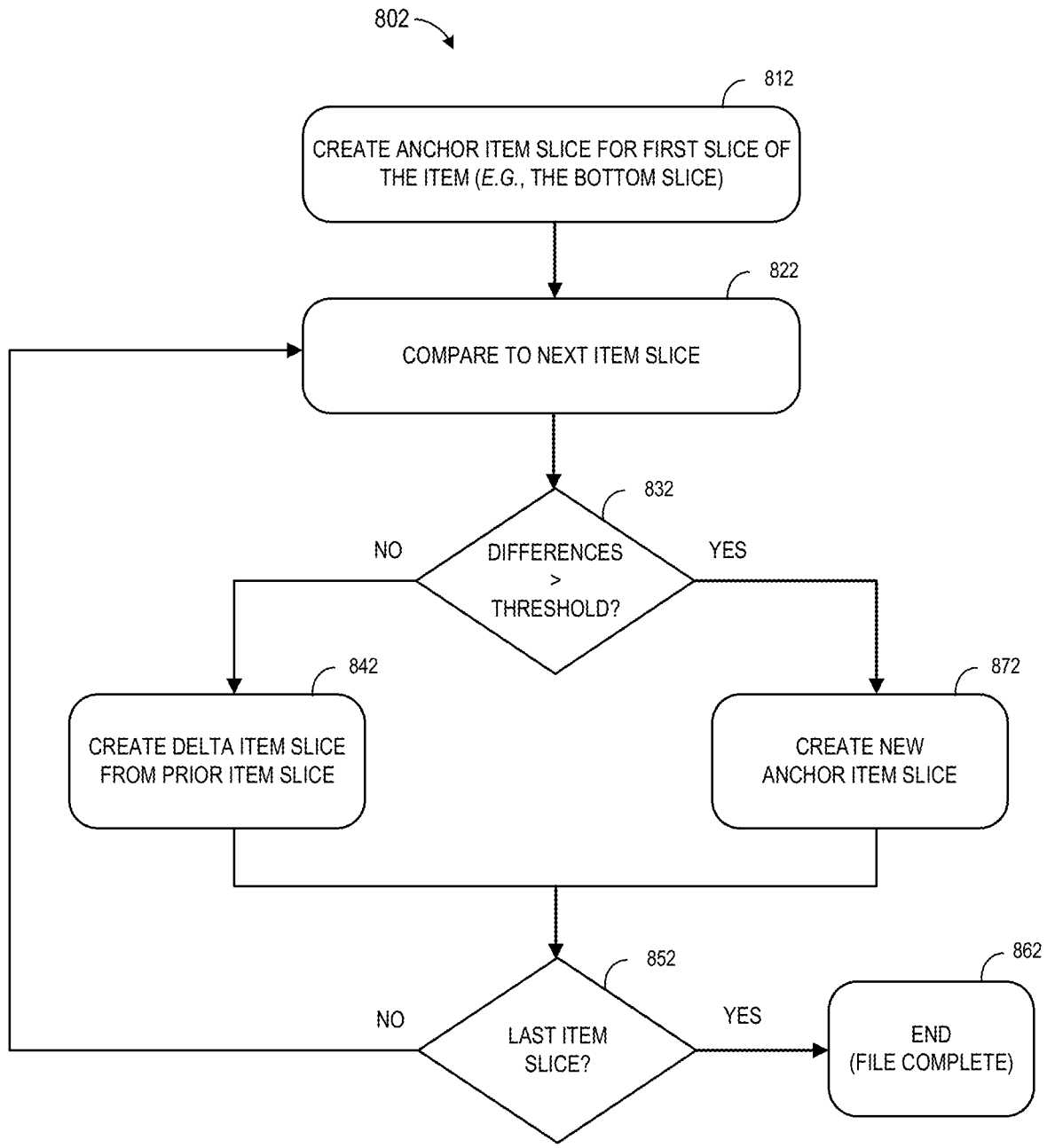

FIG. 8B illustrates a more detailed method 802 that might be performed by the system 700 described with respect to FIG. 7, or any other system, according to some embodiments of the present invention. In this method 802, the item definition file includes a plurality of item slices, from a bottom item slice to a top item slice, each item slice describing a two-dimensional portion of the three-dimensional item. The method 802 begins at 812 when a first item slice (e.g., the bottom slice of the item) is designated as an "anchor item slice." Although examples are described herein as encoding and/or decoding information from the bottom of an item to the top of the item (because that is how items are generally printed) note that embodiments might be from the top of the item to the bottom of the item, from left to right, etc. As used herein, an "anchor" item slice may be encoded using the techniques described with respect to FIGS. 3 through 6.

For at least some of the item slices, the system will encode data in the item definition file describing a particular item slice in terms of "differences" between that particular item slice and another item slice. For example, at 822, the system will compare a current item slice to a prior item slice. At 832, if the differences between the current item slice and the prior item slice are below a threshold value, the system might encode a list of which entries in a matrix have transitioned from "0" to "1" or from "1" to "0" (e.g., a "delta" item slice") at 842. Note that the cut-off or threshold value might be, according to some embodiments, a pre-determined value (e.g., a pre-determined number of difference or a pre-determined percentage of difference). According to other embodiments, an adaptable threshold might be implemented. For example, a threshold value might be dynamically calculated based on the overall properties of the item, the abilities of an additive manufacturing printer, customer requirements or preferences, etc. If the system has reached the last item slice at 852, the process ends at 862 (the compressed item definition file is complete). If the system has not reached the last item slice at 852, the next item slice is evaluated at 822 and 832.

If the differences between the current item slice and the prior item slice were above the threshold value at 832, a new anchor item slice is created at 872. The new anchor item slice may be completely encoded (as opposed to just including the deltas) using the techniques described with respect to FIGS. 3 through 6. According to some embodiments, the current item slice is compared to a neighboring item slice directly below the current item slice at 832. According to other embodiments, the current item slice is comparted to an anchor item slice below that particular item slice at 832.

Figure 9:
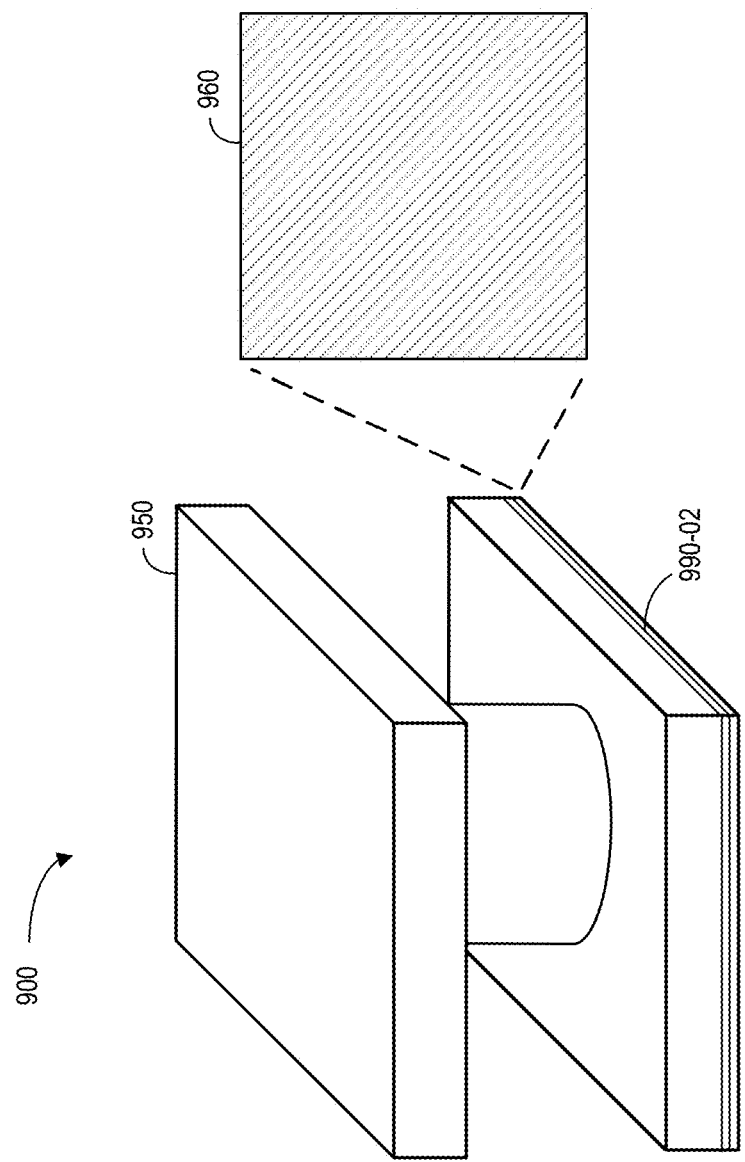
FIG. 9 is an example of a portion of a compressed item definition file for a second item slice neighboring the first item slice of FIG. 4 according to some embodiments.

FIG. 9 is an example 900 of a portion of a compressed item 950 definition file for a second item slice 990-02 neighboring the first item slice of FIG. 4 according to some embodiments. Recall that in FIG. 5, the second item slice 550-02 was encoded as an 8×8 matrix of "1s" 570. In this case, the cross-section 960 of the second item slice 950-02 is instead encoded as a simple indication that there are no changes from the prior slice (e.g., the 8×8 matrix of "1s" 470). Thus, the 64 bits of data required by the technique of FIG. 5 is not needed, resulting in a "compressed" version of the volumetric data.

Figure 10:
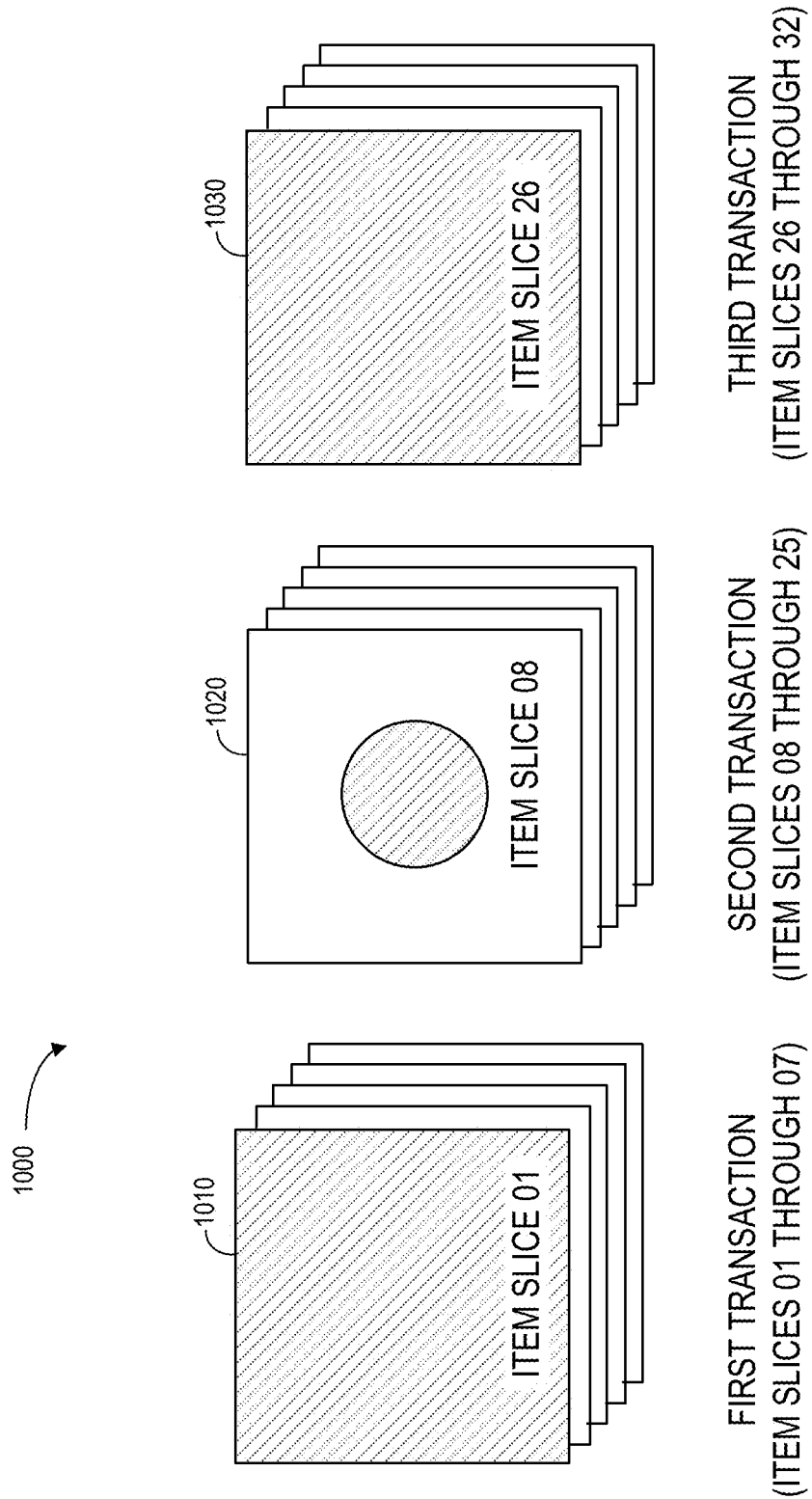
FIG. 10 illustrates sub-sets of item slices grouped into transactions in accordance with some embodiments.

FIG. 10 illustrates a complete representation 1000 of the item 950 after all slices have been compressed. In this example, only 3 anchor slices (slice 01, slice 08, and slice 26) are needed to represent the item. That is the 2048 bits needed by the technique of FIGS. 3 to 6 now only require 192 bits of data (plus some overhead indicating that the remaining slices have "no change" from the prior anchor slice). Note that different item shapes will result in different amounts of overall compression. Moreover, additional compression techniques may be applied in addition to and/or instead of the ones described with respect to FIG. 9. For example, the first item slice (encoded in FIG. 5) might be compressed on a row-by-row basis as follows:

Row 1: Eight consecutive 1s,
Row 2: Eight consecutive 1s,
Row 3: Eight consecutive 1s,
Row 4: Eight consecutive 1s,
Row 5: Eight consecutive 1s,
Row 6: Eight consecutive 1s,
Row 7: Eight consecutive 1s, and
Row 8: Eight consecutive 1s.

Thus, these eight separate indications would replace the 64 bits of data originally used to describe the anchor item slice. Similarly, the entire anchor item slice might be compressed into a single indication that the anchor item slice contains "Sixty Four consecutive 1s."

As illustrated in FIG. 10, sub-sets of item slices may be grouped into transactions 1010, 1020, 1030 each having an anchor item slice and a group of delta slices that depend from that anchor item slice (e.g., the first transaction includes item slices 01 through 07 representing the bottom portion, the second transaction includes item slices 08 through 25 representing the center portion, and the third transaction includes item slices 26 through 32 representing the top portion).

Figure 11:
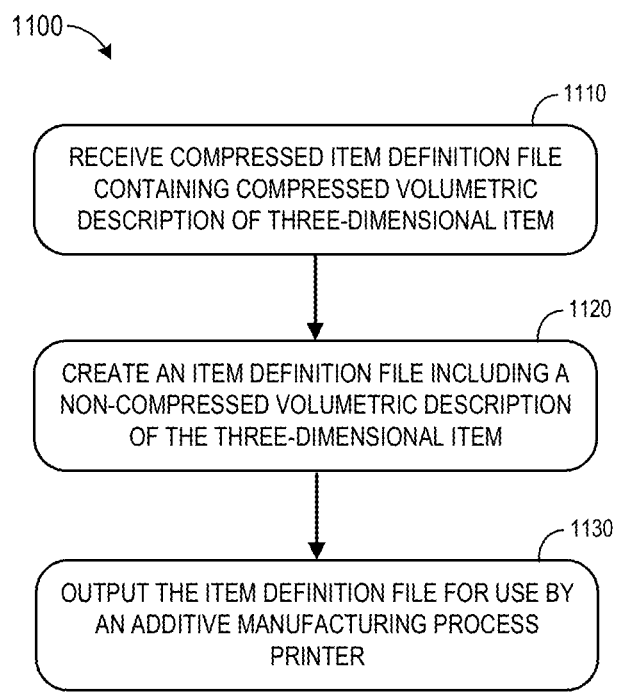
FIG. 11 illustrates a method of creating an item definition file from a compressed item definition file according to some embodiments.

A printer, additive manufacturing platform, controller, database, etc. may then turn a compressed item definition file into a non-compressed version of the file (e.g., which can be used to actually print the item). FIG. 11 illustrates a method 1100 of creating an item definition file from a compressed item definition file according to some embodiments. At 1110, the system may receive a compressed item definition file containing compressed volumetric description of a three-dimensional item. At 1120, the system creates an item definition file including a non-compressed volumetric description of the three-dimensional item and that may then be output at 1130 for use by an additive manufacturing printer. For example, the system might simply transfer anchor item slices over to the non-compressed or expanded version "as is" and modify other slices in accordance with the delta item slices.

Figure 12:
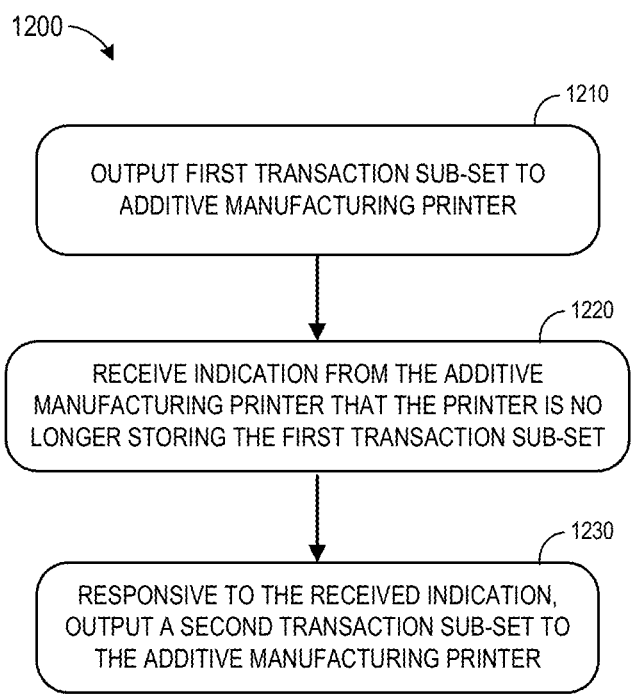
FIG. 12 illustrates the use of transactions when sending information to an additive manufacturing printer in accordance with some embodiments.

Some embodiments described herein may also facilitate the protection of intellectual property associated with a file definition file. For example, FIG. 12 illustrates the use 1200 of transactions when sending information to an additive manufacturing printer in accordance with some embodiments. At 1210, a first transaction sub-set is output to an additive manufacturing printer. At 1220, an indication is received back from the additive manufacturing printer that the printer is no longer storing the first transaction sub-set. That is, the printer may have received the sub-set (e.g., anchor item slice and associated dependent delta item slices), used the data to print that portion of the item, and purged the information from the system. Responsive to this indication, the system may output a second transaction sub-set to the additive manufacturing printer at 1230. Thus, in some embodiments, the second transaction sub-set might not be output to the additive manufacturing printer until a confirmation is received indicating that the first transaction sub-set has been deleted from the printer (thus protecting intellectual property associated with the item by preventing the printer from storing or re-constructing an entire file that completely describes the item).

Figure 13:
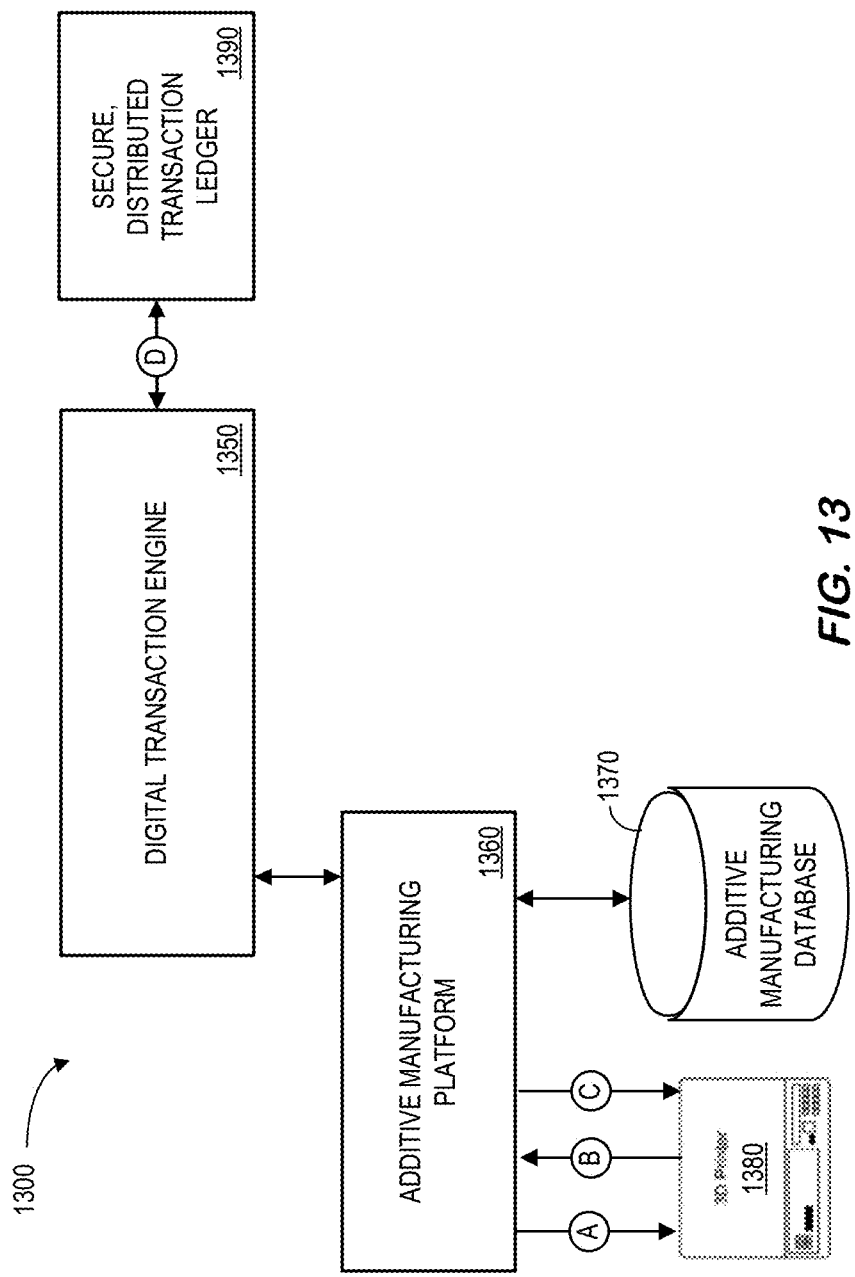
FIG. 13 is a high level block diagram of a transaction-based additive manufacturing system according to some embodiments.

FIG. 13 is a high level block diagram of a transaction-based additive manufacturing system 1300 according to some embodiments. As before, the system 1300 includes an additive manufacturing platform 1360 and an additive manufacturing database 1370 storing an item definition file containing a volumetric description of a three-dimensional item. The additive manufacturing platform 1360 may retrieve the file from the database 1370. According to some embodiments, the additive manufacturing platform 1360 may then create a compressed item definition file (including a compressed volumetric description of the item) broken into a number of different transactions. The first transaction, including the volumetric data for the bottom portion, may then be transmitted to a three-dimensional printer 1380 at (A). The printer 1380 can then create that portion of the item in accordance with the volumetric data. The printer 1380 may include special hardware, software, control boxes, etc. that ensure the first transaction data is completely wiped after that portion of the item is printed. The printer 1380 may report to the additive manufacturing platform 1360 that this process has been completed at (B). The additive manufacturing platform 1360 may then transmit the second transaction to the printer at (C). In this way, the printer 1380 will never contain a description of the entire item. According to this embodiment, the system may further include a digital transaction engine 1350 and a secure, distributed transaction ledger 1390 (e.g., incorporating blockchain technology). In this way, the additive manufacturing platform 1360 and/or any other device might record information associated with the creation of an item using a compressed item definition file (e.g., after steps (A), (B), (C), etc. are completed).

Figure 14:
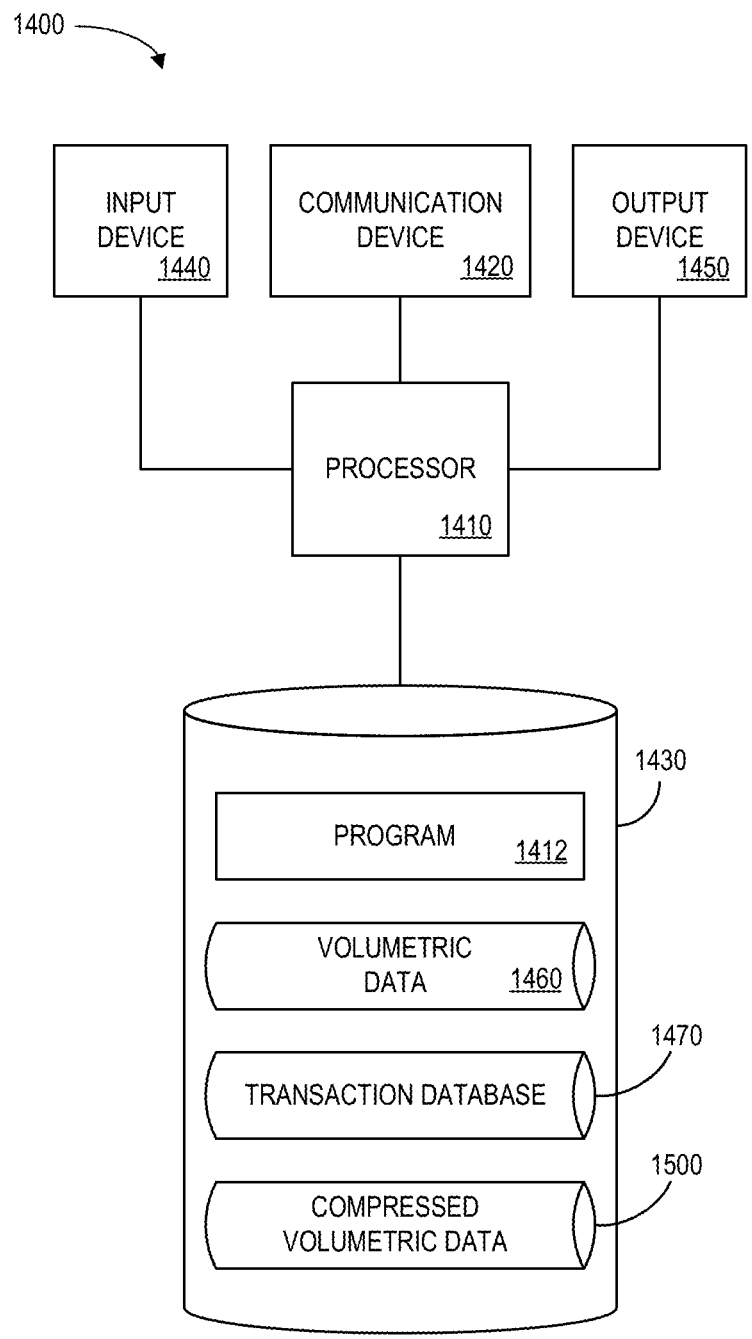
FIG. 14 illustrates a platform according to some embodiments.

Embodiments described herein may comprise a tool to help reduce item definition files sizes and/or improve security and may be implemented using any number of different hardware configurations. For example, FIG. 14 illustrates a platform 1400 that may be, for example, associated with the additive manufacturing platforms 760, 1360 of FIGS. 1 and 13 (as well as other systems described herein). The platform 1400 comprises a processor 1410, such as one or more commercially available Central Processing Units ("CPUs") in the form of microprocessors, coupled to a communication device 1420 configured to communicate via a communication network (not shown in FIG. 14). The communication device 1420 may be used to communicate, for example, with one or more remote platforms, digital transaction engines, client devices, and/or a ledger. Note that communications exchanged via the communication device 1420 may utilize security features, such as those between a public internet user and an internal network of an insurance enterprise. The security features might be associated with, for example, web servers, firewalls, and/or PCI infrastructure. The platform 1400 further includes an input device 1440 (e.g., a mouse and/or keyboard to enter information about a distributed ledger, a business relationship, etc.) and an output device 1450 (e.g., to output pedigree reports, generate production status alert messages, etc.).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or network security service tool or application for controlling the processor 1410. The processor 1410 performs instructions of the program 1412, and thereby operates in accordance with any of the embodiments described herein. For example, the processor 1410 may receive an item definition file containing a volumetric description of a three-dimensional item and create a compressed item definition file including a compressed volumetric description of the three-dimensional item. For example, the item definition file may include a plurality of item slices, from a bottom item slice to a top item slice, each item slice describing a two-dimensional portion of the three-dimensional item. For at least some of the item slices, the processor 1410 may encode data in the item definition file describing a particular item slice in terms of differences between that particular item slice and another item slice (e.g., a neighboring item slice directly below that particular item slice or an anchor item slice below that particular item slice).

The program 1410 may be stored in a compressed, uncompiled and/or encrypted format. The program 1410 may furthermore include other program elements, such as an operating system, a database management system, and/or device drivers used by the processor 1410 to interface with peripheral devices.

As used herein, information may be "received" by or "transmitted" to, for example: (i) the platform 1400 from another device; or (ii) a software application or module within the platform 1400 from another software application, module, or any other source.

In some embodiments (such as shown in FIG. 14), the storage device 1430 further stores volumetric data 1460, a transaction database 1470, and compressed volumetric data 1500. An example of a database that might be used in connection with the platform 1400 will now be described in detail with respect to FIG. 15. Note that the database described herein is only an example, and additional and/or different information may be stored therein. Moreover, various databases might be split or combined in accordance with any of the embodiments described herein. For example, the transaction database 1470 and volumetric data 1460 might be combined and/or linked to each other within the program 1410.

Figure 15:
FIG. 15 is a portion of a compressed volumetric data in accordance with some embodiments.

Referring to FIG. 15, a table is shown that represents the compressed volumetric data 1500 that may be stored at the platform 1400 in accordance with some embodiments. The table may include, for example, entries identifying slices of a three-dimensional item. The table may also define fields 1502, 1504, 1506, 1508, 1510, 1512 for each of the entries. The fields 1502, 1504, 1506, 1508, 1510, 1512 may, according to some embodiments, specify: an item identifier 1502, a transaction identifier, an item slice and type 1506, a status 1508, a blockchain result 1510, and data 1512. The compressed volumetric data 1500 may be created and updated, for example, based on information electrically received from remote customer platforms, additive manufacturer platforms, distributed ledger devices, etc.

The item identifier 1502 may be, for example, a unique alphanumeric code identifying a three-dimensional item being created for a customer, and the transaction identifiers 1504 may be used to assign each slice to a separate transaction (or sub-group of item slices). The item slice and type 1506 may identify a particular item slice whether it is an anchor item slice or a delta item slices (containing differences). The status 1508 might indicate if that particular slice is pending to be printed, at a printer, already printed, etc. and the blockchain result 1510 might indicate that some of all of the information has been verified via a distributed ledger. The data 1512 might represent the bits that define the item slice 1506.

Figure 16:
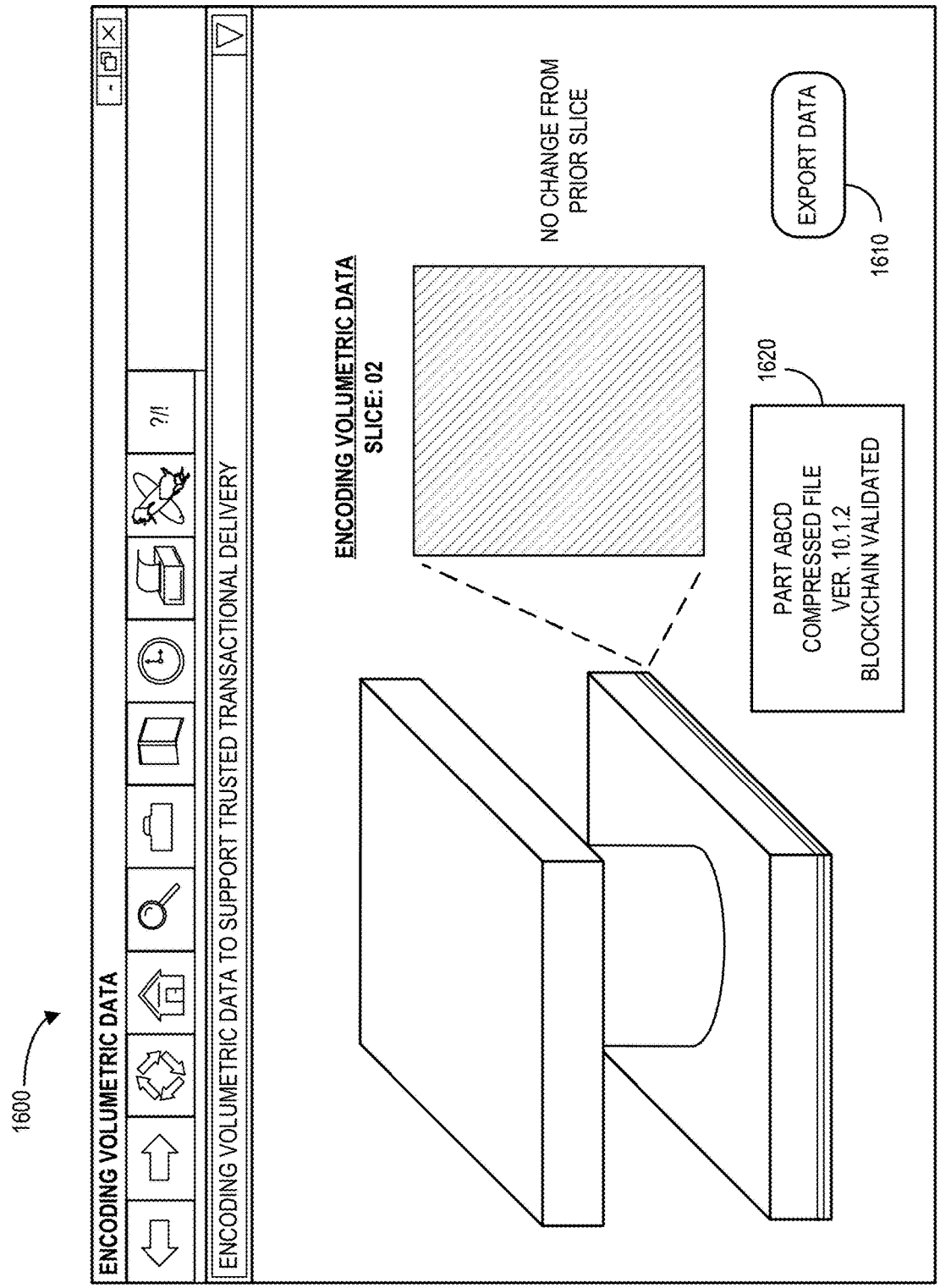
FIG. 16 illustrates a computer display according to some embodiments.

FIG. 16 illustrates a computer display 1600 in accordance with some embodiments. The display 1600 includes a graphical representation of an item being compressed such that a user may select elements of the process (e.g., via a computer mouse or touchscreen) to see further information and/or adjust details about that element (e.g., via a pop-up window). According to some embodiments, the display 1600 includes one or more selectable icons 1610 that can be used to export or import data, save files, publish information, perform a blockchain validation, print an item, etc.

Figure 17:
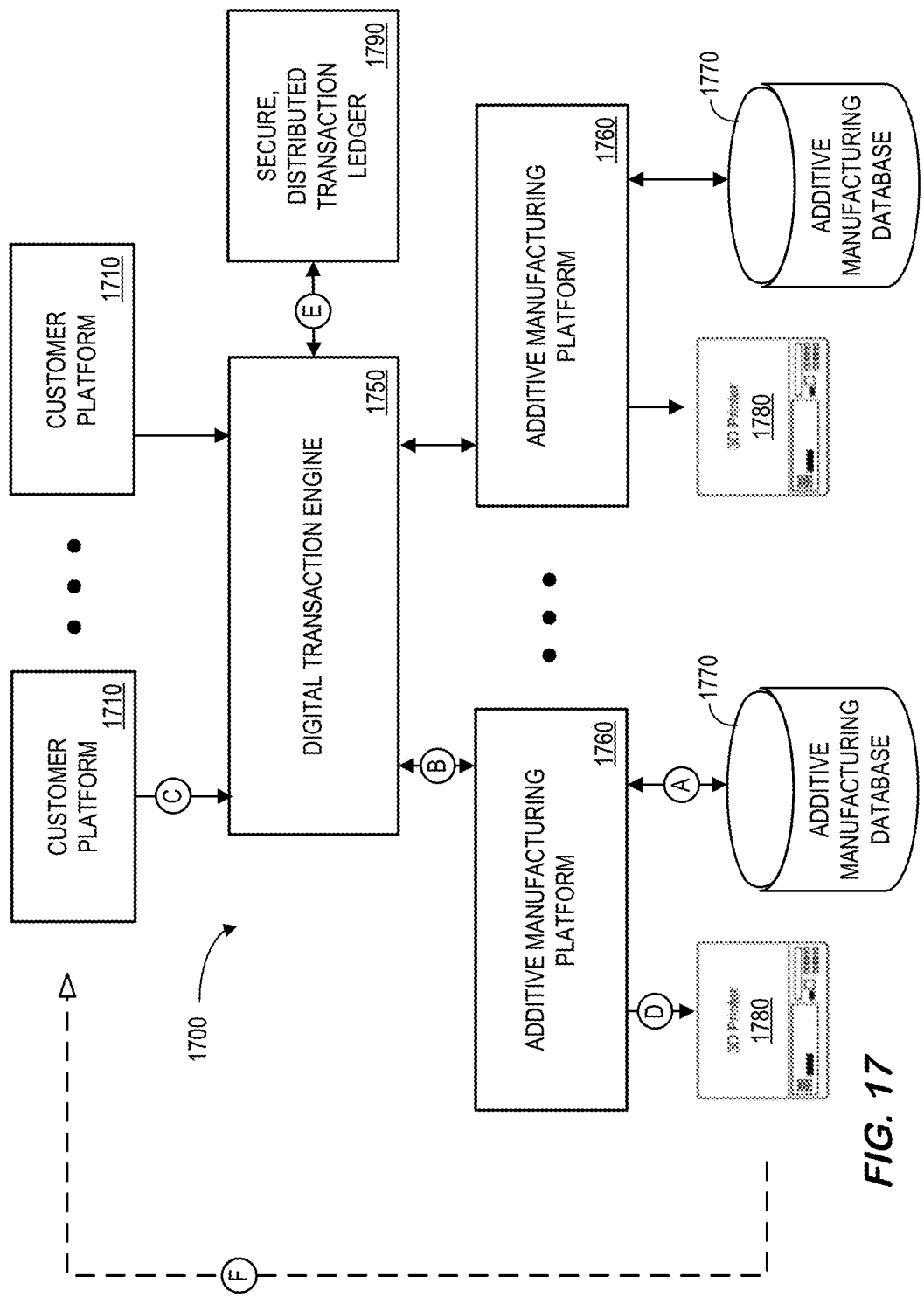
FIG. 17 is a system incorporating a secure, distributed transaction ledger in accordance with some embodiments.

According to some embodiments, information associated with a compressed item definition file is recorded via a secure, distributed transaction ledger (e.g., associated with blockchain technology). For example, FIG. 17 is a system 1700 incorporating a secure, distributed transaction ledger in accordance with some embodiments. The system includes a digital transaction engine 1750 with a communication port to exchange information with a number of customer platforms 1710. According to some embodiments, the digital transaction engine 1750 receives an industrial asset item request from one of the customer platforms 1710 and assigns the request to one of a number of additive manufacturing platforms 1760. Each additive manufacturing platform 1760 might include and/or be associated with an additive manufacturing database 1770 (e.g., storing a printer version number, a maximum resolution of a printer, powder specifics, a minimum turnaround time for a newly received job, etc.) and a three-dimensional printer 1780. The digital transaction engine 1750 and/or other elements of the system may then record information about the transaction using a secure, distributed transaction ledger 1790 (e.g., via a blockchain verification process). For example, the digital transaction engine 1750 might record an order date and time, a price, a bid, a compressed item definition file, etc. via the secure, distributed transaction ledger 1790 in accordance with any of the embodiments described herein. According to some embodiments, the distributed ledger might be associated with the HYPERLEDGER® blockchain verification system. Note that the digital transaction engine 1750 could be completely de-centralized and/or might be associated with a third party, such as a vendor that performs a service for an enterprise.

For example, at (A) the additive manufacturing platform 1760 may obtain additive manufacturing capability data from the additive manufacturing database 1770 and provide that information to the digital transaction engine 1750 at (B). At (C), the customer platform 1710 may transmit an industrial asset item request to the digital transaction engine 1750. The digital transaction engine may then assign the request one of the additive manufacturing platforms 1760 (e.g., by transmitting a compressed definition file to the platform 1760 one transaction at a time). The additive manufacturing platform 1760 can then communicate with the three-dimensional printer 1780 at (D) to initiate a printing process. Note that each step of the transaction may be recorded in the secure, distributed transaction ledger 1790 at (E). When created, the completed item may be provided to the customer at (F) (as illustrated by the dashed arrow in FIG. 17).

Thus, embodiments may provide a method to compress and encode volumetric data to support trusted transactional delivery of the data. Moreover, embodiments may provide file segments that can be distributed, in sequence, as needed. According to some embodiments, a part's CAD definition maybe encoded as a Common Layer Interface ("CLI") or Stereo Lithography Interface ("SLI") file through the use of a scan path generation algorithm. The algorithm may, for example, split the CAD, by height, into slices. Each slice may then be encoded as a scan path of that slice. Finally, all of the slices may be merged into a single CLI file that contains the independent scan path of all slices.

According to some embodiments, an anchor slice may be generated from the initial slice (that is, a fully detailed slice that will be used to initialize a frame of reference for all slices that are dependent on that anchor slice). Dependent slices may then be derived by applying a difference, or delta, to an anchor slice, producing a dependent slice. All dependent slices may be produced using the same methodology until the delta required for the next slice is determined to be too large. When the delta between a dependent slice and the next sequential slice is too large, a new anchor slice maybe created. These steps may be repeated until the entire CAD is encoded, producing a repeating sequence of anchor slices and dependent slice deltas. According to some embodiment, hash values associated with a give slice and/or slices may be stored for later content verification (e.g., using a Merkle tree or a similar tree in which every non-leaf node is labeled with the hash values of child nodes).

Figure 18:
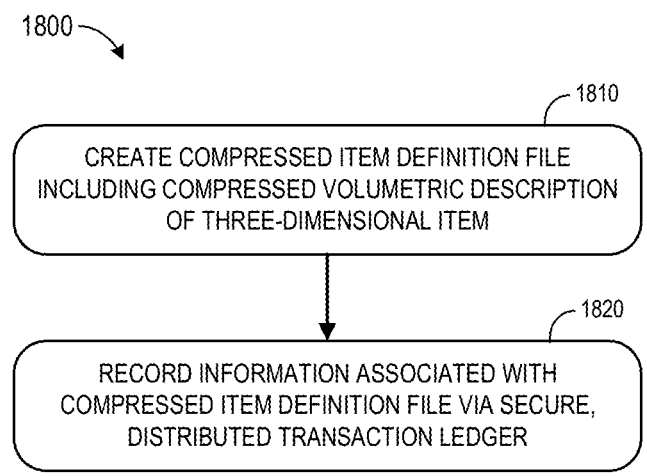
FIG. 18 is a method incorporating a secure, distributed transaction ledger according to some embodiments.
Figure 19:
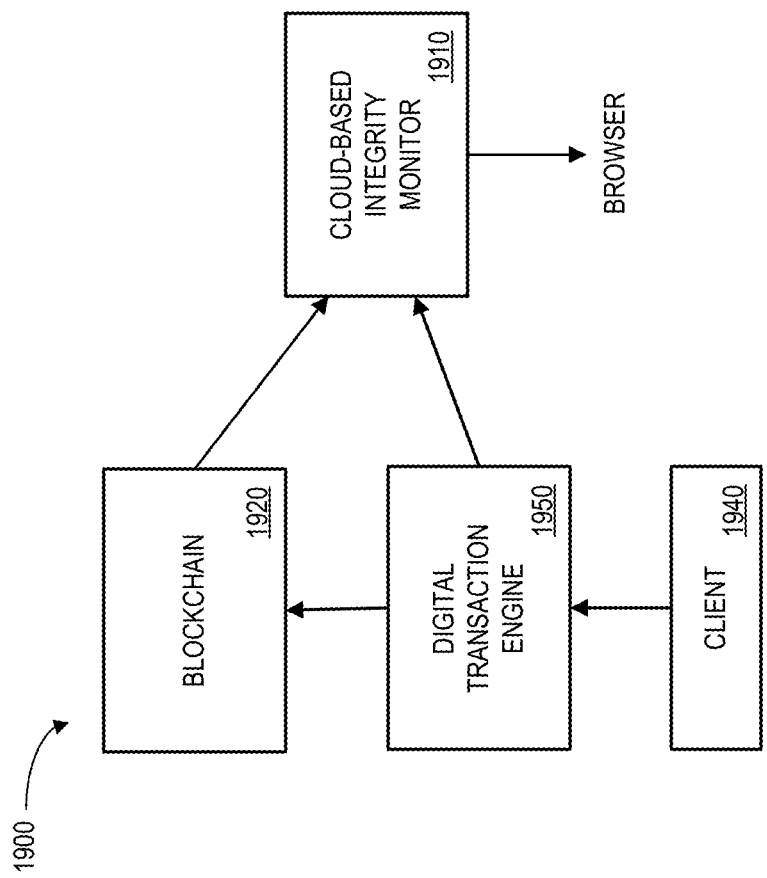
FIG. 19 is a system implementing compressed item definition files with blockchain validation according to some embodiments.
Figure 20:
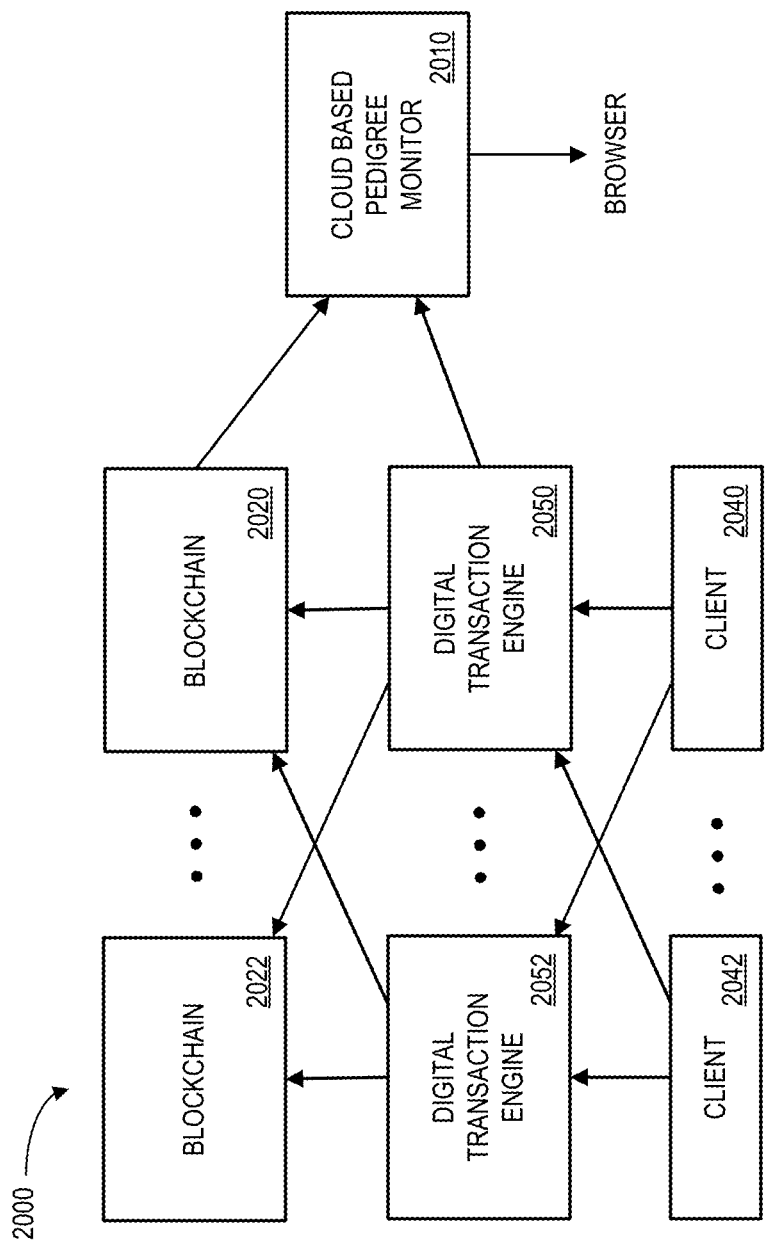
FIG. 20 is a system implementing compressed item definition files with multiple digital transaction engines in accordance with some embodiments.

These repeating sequences can then be combined into a transaction to deliver the encoded information in segments and, according to some embodiments, information about transactions may be recorded using blockchain technology. For example, FIG. 18 is a method 1800 incorporating a secure, distributed transaction ledger according to some embodiments. At 1810, the system creates a compressed item definition file including a compressed volumetric description of a three-dimensional item. At 1820, the system may record information associated with the compressed item definition file via a secure, distributed transaction ledger. For example, FIG. 19 is a system 1900 implementing compressed item definition files incorporating blockchain validation according to some embodiments. A cloud-based integrity monitor 1910 may provide transaction integrity data via a web browser and exchange information with a blockchain 1920 and a digital transaction engine 1950 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 1950 may be associated with a MySQL database. In this way, the digital transaction engine 1950 and blockchain 1920 can be used to provide transaction level verification for a client 1940. Although FIG. 19 illustrates a system 1900 with a single blockchain 1920 and digital transaction engine 1950, note that embodiments may employ other topologies. For example, FIG. 20 is a system 2000 implementing compressed item definition files sharing incorporating multiple digital transaction engines in accordance with some embodiments. In particular, an additional blockchain 2022 and digital transaction engine 2052 may provide protection for an additional client 2042. As illustrated in FIG. 20, each digital transaction engine 2050, 2052 may be associated with multiple blockchains 2020, 2022 providing additional protection for the system 2000 (e.g., by storing information at multiple, geographically disperse nodes making attacks impractical). That is, each verifier (e.g., a digital transaction engine or additive manufacturing printer) may commit a brief summary to an independent data store and, once recorded, the information cannot be changed without detection to provide a tamper-proof System of Records ("SoR").

Note that different types and/or amounts of information might be recorded in a secure, distributed ledger. For example, data might be stored in a slice-by-slice basis, an anchor slice along with all associated dependent item slice basis, an item-by-item basis, etc. Moreover, information about a particular additive manufacturing printer, an additive manufacturing platform, a production process or environment (e.g., a temperature), a source material (e.g., powder description), a customer, a design file, a customer platform, a payment, a quality review process or result, etc. might be stored via a secure distributed ledger (e.g., using blockchain technology).

Figure 21:
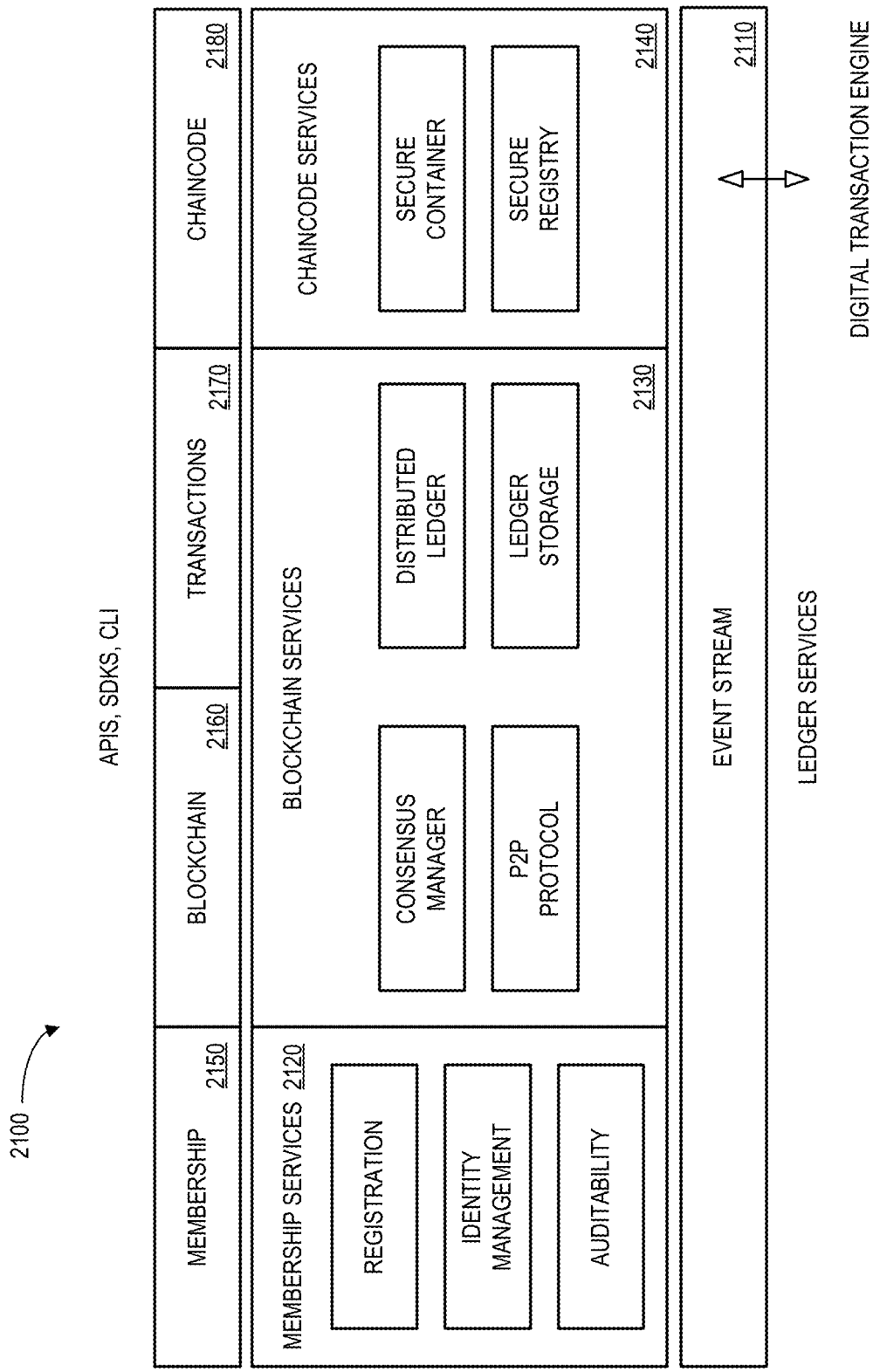
FIG. 21 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 21 is a distributed ledger reference architecture 2100 according to some embodiments. The architecture 2100 includes ledger services and an event stream 2110 that may contain network security service information (e.g., from a first entity device). Membership services 2120 (e.g., including registration, identity managements, and/or an auditability process) may manage identity, privacy, and confidentiality for membership 2150 for the network security service. Blockchain services (e.g., including a consensus manager, Peer-to-Peer ("P2P") protocol, a distributed ledger, and/or ledger storage) may manage the distributed ledger through a P2P protocol to maintain a single state that is replicated at many nodes to support blockchains 2160 and transactions 2170. Chaincode services (e.g., secure container and/or a secure registry associated with a smart contract) may help compartmentalize smart contract (or chaincode 2180) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 2100.

Thus, some embodiments described herein may use blockchain technology to provide a building block for a digital ecosystem with strong encryption and precise control of intellectual property associated with volumetric data (e.g., to support pedigree histories). Moreover, embodiments may help prevent counterfeit parts from being created by additive manufacturing processes. In addition, embodiments may segment the intellectual property contained in a volumetric data file to allow for segment-level transactions. Further, embodiments may reduce the amount of information required to transmit volumetric data, reduce the amount of physical storage required to preserve volumetric data, and/or reduce the amount of physical memory required to manipulate volumetric data.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 22:
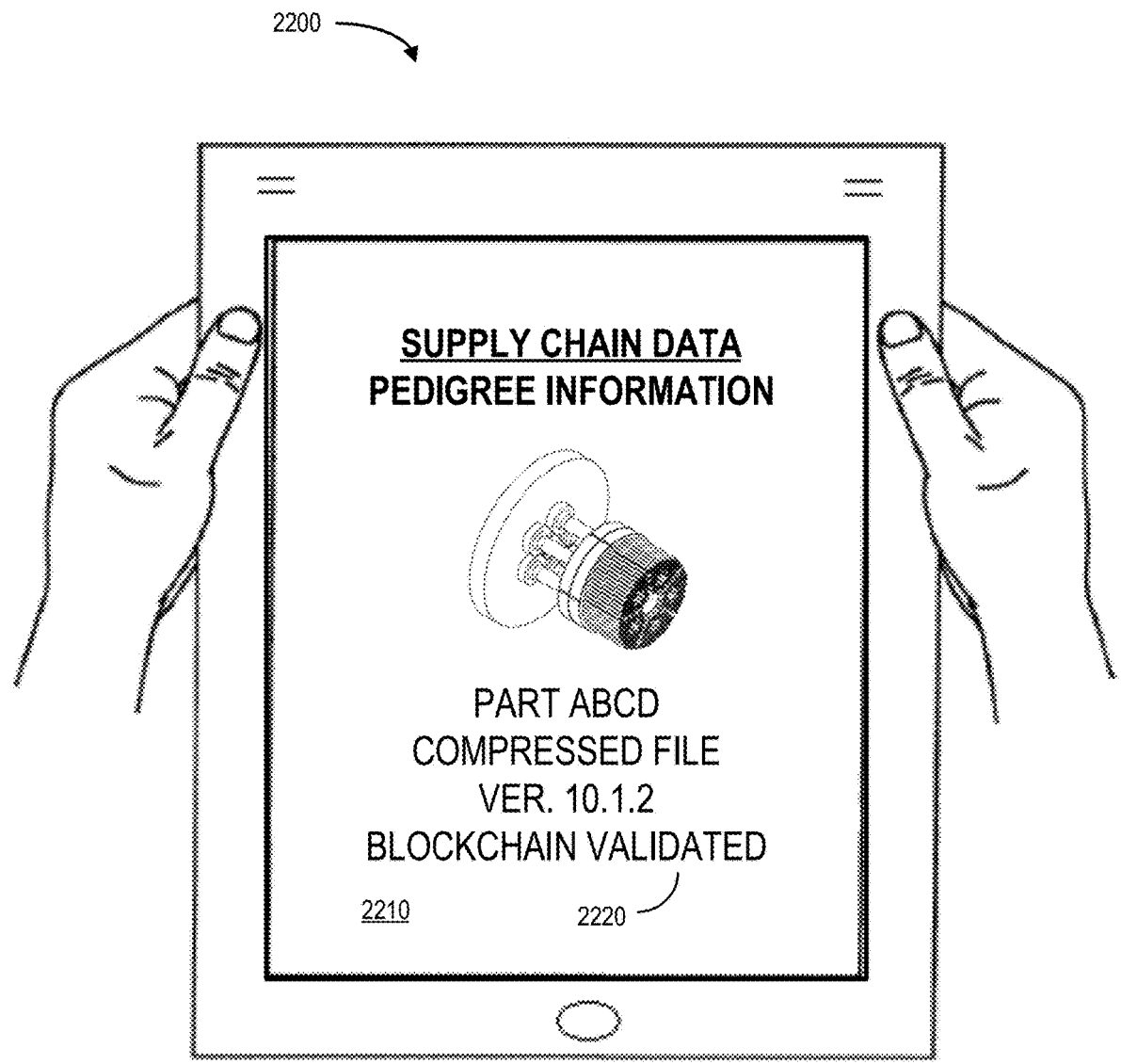
FIG. 22 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial assets, note that embodiments might be associated with other item types including consumer items. Similarly, the displays shown and described herein are provided only as examples, and other types of displays and display devices may support any of the embodiments. For example, FIG. 22 illustrates a tablet computer 2200 with a display 2210 that might utilize an interactive graphical user interface. The display 2210 might comprise a graphical overview of an item's manufacturing history (e.g., pedigree). Selection of an element on the display 2210 might result in further information 2220 about that element being presented (e.g., the pedigree of an industrial asset part, compressed item definition file data, etc.).

In some embodiments described herein, the encoding of volumetric data being with using a bottom item slice as an initial anchor slice. Note, however, that embodiments might instead use any other item slice as an initial anchor slice. For example, a top item slice might be used as an initial anchor slice. In other implementations, both the bottom item slice and the top item slice might be treated as anchor slices (and additional item slices might be defined using both—thus encoding the item from below and above until the two processes meet somewhere near the middle of the item). In still other approaches, an internal item slice might be used as an initial item slice. For example, a center item slice might be used as an initial anchor slide and additional item slices might be encoded both above the center item slice (until the top of the item is reached) and below the center item slice (until the bottom of the item is reached). That is, an item slice (and any number of item slices) might be used as an initial anchor slice in accordance with any of the embodiments described herein. Similarly, although embodiments have been described using horizontal slices, note that encoding approaches might be associated with another other type of item slices (e.g., vertical slices, angled slices, etc.)

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of a three-dimensional item via an additive manufacturing printer, the system comprising:
a processor configured to:
receive an item definition file containing a volumetric description of the three-dimensional item;
create a compressed item definition file including a compressed volumetric description of the three-dimensional item; and
output the compressed item definition file via a plurality of transaction sub-sets to be printed via the additive manufacturing printer, wherein information associated with the compressed item definition file comprises a sub-set comprising a reference item slice and differences between the reference item slice and a plurality of item slices, wherein the information associated with the compressed item definition file is recorded via a secure, distributed transaction ledger comprising blockchain technology.

2. The system of claim 1, wherein the processor is configured to:
output a first transaction sub-set of the plurality of transaction sub-sets to the additive manufacturing printer;
receive, from the additive manufacturing printer, an indication that the additive manufacturing printer is no longer storing the first transaction sub-set; and
in response to receiving the indication, output a second transaction sub-set of the plurality of transaction sub-sets to the additive manufacturing printer.

3. The system of claim 2, wherein receiving the indication from the additive manufacturing printer comprises receiving a confirmation that the first transaction sub-set is deleted from the additive manufacturing printer, such that the additive manufacturing printer is barred from storing an entirety of the compressed item definition file that describes the three-dimensional item.

4. The system of claim 1, wherein each transaction sub-set of the plurality of transaction sub-sets comprises the plurality of item slices, wherein the plurality of item slices is indicative of a section of the three-dimensional item.

5. The system of claim 4, wherein the processor is configured to, for at least some of the plurality of item slices, encode data describing a particular item slice of the plurality of item slices in terms of differences between that particular item slice and another item slice of the plurality of item slices.

6. The system of claim 1, wherein the information recorded via the secure, distributed transaction ledger comprises data indicative of a production process, a source material, a customer platform, payment data, a quality review result, or a combination thereof.

7. The system of claim 1, comprising a digital transaction engine configured to record information relating to transaction of data between a customer platform and the processor via the secure, distributed transaction ledger.

8. The system of claim 1, comprising the additive manufacturing printer, wherein the additive manufacturing printer is configured to generate the three-dimensional item via at least one of three-dimensional printing, vat photopolymerization, material jetting, binder jetting, material extrusion, powder bed fusion, sheet lamination, and directed energy deposition.

9. A computer-implemented method to facilitate creation of a three-dimensional item via an additive manufacturing printer, the computer-implemented method comprising:
receiving an item definition file containing a volumetric description of the three-dimensional item;
creating a compressed item definition file including a compressed volumetric description of the three-dimensional item; and
outputting the compressed item definition file via a plurality of transaction sub-sets to be printed via the additive manufacturing printer, wherein information associated with the compressed item definition file comprises a sub-set comprising a reference item slice and differences between the reference item slice and a plurality of item slices, wherein information associated with the compressed item definition file is recorded via a secure, distributed transaction ledger comprising blockchain technology.

10. The computer-implemented method of claim 9, wherein outputting the compressed item definition file comprises:
outputting a first transaction sub-set of the plurality of transaction sub-sets to the additive manufacturing printer;
receiving an indication that the additive manufacturing printer is no longer storing the first transaction sub-set; and
in response to receiving the indication, outputting a second transaction sub-set of the plurality of transaction sub-sets to the additive manufacturing printer.

11. The computer-implemented method of claim 9, wherein receiving the indication from the additive manufacturing printer comprises receiving a confirmation that the first transaction sub-set is deleted from the additive manufacturing printer, such that the additive manufacturing printer is barred from storing an entirety of the compressed item definition file that describes the three-dimensional item.

12. The computer-implemented method of claim 9, wherein each transaction sub-set of the plurality of transaction sub-sets comprises the plurality of item slices indicative of a section of the three-dimensional item, and wherein the computer-implemented method comprises encoding, for at least some of the plurality of item slices, data describing a particular item slice of the plurality of item slices in terms of differences between that particular item slice and another item slice of the plurality of item slices.

13. The computer-implemented method of claim 9, wherein recording the information recorded via the secure, distributed transaction ledger comprises recording data indicative of a production process, a source material, a customer platform, payment data, a quality review result, or a combination thereof.

14. The computer-implemented method of claim 9, wherein each transaction sub-set of the plurality of transaction sub-sets comprises the plurality of item slices indicative of a section of the three-dimensional item, and wherein the computer-implemented method comprises identifying a particular item slice of the plurality of item slices as an anchor item slice when differences between that particular item slice and another item slice of the plurality of item slices exceeds a threshold.

15. A system to facilitate creation of a three-dimensional item via an additive manufacturing printer, the system comprising:
a processor configured to:
receive an item definition file containing a volumetric description of the three-dimensional item;
create a compressed item definition file including a compressed volumetric description of the three-dimensional item; and
output the compressed item definition file via a plurality of transaction sub-sets to be printed via the additive manufacturing printer, wherein information associated with the compressed item definition file comprises a sub-set comprising a reference item slice and differences between the reference item slice and a plurality of item slices.

16. The system of claim 15, comprising a digital transaction engine configured to record information relating to transaction of data between the processor and the additive manufacturing printer via a secure, distributed transaction ledger comprising blockchain technology.

17. The system of claim 15, wherein each transaction sub-set of the plurality of transaction sub-sets comprises the plurality of item slices indicative of a two-dimensional section of the three-dimensional item.

18. The system of claim 17, wherein the processor is configured to identify a particular item slice of the plurality of item slices as an anchor item slice when differences between that particular item slice and another item slice of the plurality of item slices exceeds a threshold.

19. The system of claim 18, wherein the anchor item slice is one of a plurality of anchor item slices, wherein the processor is configured to group the plurality of item slices such that each transaction sub-set of the plurality of transaction sub-sets includes a particular anchor item slice of the plurality of anchor item slices.

20. The system of claim 15, wherein the processor is configured to:
output, at a first time, a first transaction sub-set of the plurality of transaction sub-sets to the additive manufacturing printer; and
output, at a second time, a second transaction sub-set of the plurality of transaction sub-sets to the additive manufacturing printer in response to a determination that the additive manufacturing printer has purged information relating to the first transaction sub-set.

* * * * *